Jan. 19, 1971    J. E. EHRREICH III, ETAL    3,556,803
METHOD OF MAKING A CARBONATED COMPOSITION
Filed Feb. 15, 1967

INVENTORS
JOHN E. EHRREICH III
ADRIAN R. RETI
PIERRE L.T. BRIAN
BY
*Blair Buckles & Cesari*
ATTORNEYS

United States Patent Office 3,556,803
Patented Jan. 19, 1971

3,556,803
METHOD OF MAKING A CARBONATED COMPOSITION
John E. Ehrreich III, Watertown, Adrian R. Reti, Cambridge, and Pierre L. T. Brian, Concord, Mass., assignors to Dynatech Corporation, Cambridge, Mass.
Filed Feb. 15, 1967, Ser. No. 616,305
Int. Cl. A23l 1/00
U.S. Cl. 99—79                                          4 Claims

ABSTRACT OF THE DISCLOSURE

A solid material is formed of an at least slightly water soluble polymeric acid and a carbonate. When the solid material is placed in a container of water, the acid and carbonate react to evolve carbon dioxide and a substantially water insoluble salt. The physical integrity of the solid material is not destroyed by the reaction.

BACKGROUND OF INVENTION

Field

The present invention relates to a method and materials capable of evolving carbon dioxide. More specifically, it relates to a novel material for evolving carbon dioxide in beverages.

Prior art

The market for carbonated beverages has increased at a dramatic rate over the past twenty years. It is estimated that this market now is in the order of four billion dollars annually. Up to the present, this market has been served almost exclusively by beverages which have been precarbonated and then packaged in bottles or cans. While carbonation of beverages at the point of consumption, such as at soda fountains, has been practiced for years, carbonation of beverages in the home has not been greeted with wide acceptance.

Home-made carbonated beverages approximating the taste and quality of commercially bottled beverages have long been sought. This, of course, is possible by using a commercially bottled carbonated water, but such a solution is probably more costly than purchasing a commercially bottled beverage.

Another approach has been the use of yeast and invert sugar in home bottled drinks. The yeast of course causes fermentation of the sugar and subsequent evolution of carbon dioxide and this reaction carbonates the drink. A principal disadvantage of this approach is that a sludge forms in the bottom of the bottle which will cloud the beverage if it is agitated. Such a residue has an unpleasing taste and appearance. Also, it takes days or weeks for completion of the reaction, depending upon the temperature.

Yet another solution to the problem of making carbonated beverages in the home involves the use of dry mixes containing flavors and sugars along with a gas generation system such as sodium bicarbonate and citric acid. This type of drink, however, has two significant disadvantages. First, there is the undesirable flavor of the soluble salt reaction product, such as sodium citrate if sodium bicarbonate and citric acid are used to generate the gas. Secondly, there is the disadvantage that the dry mix reacts very quickly and the "fizzing" is finished before the drink is fully consumed. Like the yeast carbonation method, these mixtures may also leave residues in the beverage.

OBJECTS

It is, therefore, an object of this invention to provide a material capable of evolving carbon dioxide upon contact with water which is suitable for making carbonated beverages characterized by a long carbon dioxide release time and freedom from unpleasant taste.

Another object of this invention is the provision of a carbon dioxide-producing pellet or wafer which may be placed in a beverage to carbonate it and to simulate the visual effects of carbonation without imparting foreign flavors to it.

An additional object of this invention is to provide a source of carbon dioxide which is easily stored, which is not subject to deterioration and has a long shelf life.

A further object of this invention is to provide a disposable container coated with a material capable of releasing carbon dioxide in a beverage poured therein without adversely affecting its taste.

Yet another object of this invention is to provide a beverage carbonated by means of a material which provides a long period of carbon dioxide release life and freedom from unpleasant taste.

A still further object of this invention is to provide a method of making a porous body capable of evolving carbon dioxide upon contact with water and water solutions, and which is capable of carbonating a beverage without imparting to it any undesirable flavor.

An additional object of this invention is to provide a therapeutic tablet capable of evolving carbon dioxide upon contact with water and water solutions which does not impart any undesirable flavor to the solution.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

STATEMENT OF INVENTION

Our invention makes use of the unique combination of a carbonate and polymeric acid that is preferably thermoplastic and preferably at least slightly soluble. By "at least slightly soluble" it is meant that polymer chains from one polymer acid particle can partially migrate and mix with polymer chains from other particles of polymer acid when the polymer acid is immersed in water.

In the presence of water this unique composition of polymer acid and carbonate reacts to produce carbon dioxide and a salt (preferably an insoluble salt) of the polymeric acid. When the mixture is used to carbonate a beverage no undesirable taste is imparted to the beverage since the salt reaction product does not go into solution.

This reaction may be characterized as follows:

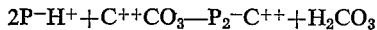

Where PH is the polymeric acid and C++ is a cation of the carbonate.

In one form of our invention, we shape the carbon dioxide-evolving material into a porous body. The combination of an at least slightly soluble polymeric acid and a carbonate, is formed under heat and/or pressure to produce a compact mass permeable to water and water solutions. This porous body may also be reinforced with a fibrous matrix. If preferred, it may be formed into a wafer and crimped or adhesively bonded to the bottom of a container. When formed into a wafer, the polymer acid and its salt act as a binder after the wafer is immersed in water. This enables the wafer to preserve its physical integrity in spite of the forces created by gas evolution.

Our invention also relates to the method of making a porous body capable of evolving carbon dioxide upon contact with water and water solutions. This method involves mixing one part of the polymeric acid into one-half to twelve parts by weight of a metallic carbonate. The mixture is then dispersed in a nondissolving volatile liquid. We evaporate the liquid to form a somewhat adherent uniform mass. The mass is then compressed at a temperature and for a time sufficient to produce a firmly adherent mass in the form of a porous body permeable to water and water solutions.

Our invention may also be used to provide a therapeutic tablet capable of evolving carbon dioxide upon contact with water and water solutions. This tablet contains the compressed mixture of a polymeric acid and a metal carbonate together with one or more therapeutic agents such as a digestive juice buffering compound, aspirin and acetanilide, which are set free in a carbonated solution when water is added to the tablet.

BRIEF DESCRIPTION OF DRAWINGS

For a fuller understanding of the nature and objects of the invention, reference should be had to the following detailed description taken in connection with the accompanying drawing, in which.

DESCRIPTION OF PREFERRED EMBODIMENTS

Figures 1, 2:
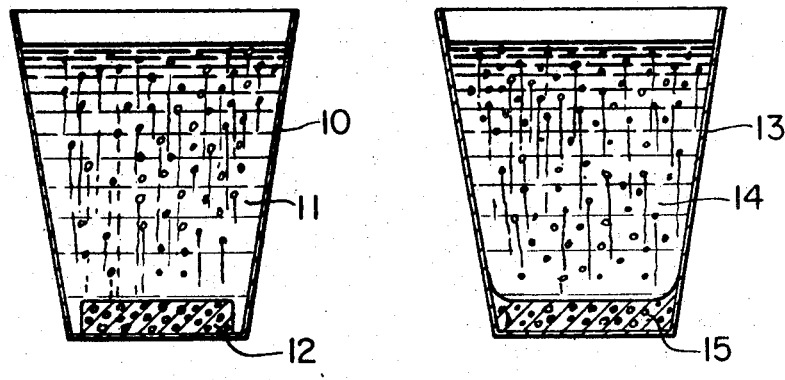
FIG. 1 illustrates, in cross-section, the material of the present invention in a beverage.
FIG. 2 illustrates, in cross-section, the material of the present invention adhered to a container which is filled with a beverage.

Basically, the carbon dioxide-producing material of our invention includes a carbonate source and a polymer acid, which is preferably thermoplastic and also preferably soluble or partially soluble in water. We prefer to use a very slightly soluble carbonate. The bivalent and trivalent metal carbonates are, therefore, more suitable than the monovalent metal carbonates which tend to be quite soluble. Furthermore, the bivalent and trivalent metal ions, because of their valence, in effect cross-link the polymeric acid. This renders the reaction product insoluble in water and prevents it from contaminating the beverage. Flavors, sugar and other additives may also be included.

The polymer acid is usually mixed in dry powder form with the carbonate salt. The mixing of the powders may be carried out entirely dry or with a non-dissolving volatile liquid. After mixing, if a volatile liquid is used, it is allowed to evaporate. The mixture can be pressed into a porous wafer with the plasticity of the polymeric acid causing it to fuse into a binding matrix for the carbonate. Care should be taken in applying heat and pressure to maintain sufficient porosity in the wafer so that in use the carbon dioxide gas can readily escape in the form of small bubbles.

Nothing in the prior art is known to lend itself to pre-mixing of the ingredients to provide the benefits of this invention. Typical of past practice is the teaching of Hughes in United States Patent No. 2,742,363. This involves the use of ion exchange granules of the cation type, namely, sulfonated styrene divinyl benzene copolymer or sulfonated phenol formaldehyde resin. These resins are cross-linked polymers; thus they are both insoluble and infusible. They cannot be molded without the use of an additional binder and are insoluble in water and other common solvents.

When the cross-linked resins proposed by Hughes are used, e.g. with metallic carbonates to generate carbon dioxide in a water solution, the carbonate ionizes and the metal ions of the carbonate are freed into the solution and then are exchanged with the hydrogen ion of the sulfonic acid group of the resin. In other words, the solution is contaminated with metal ions and then cleaned up by removal of these ions with the ion exchange resin.

On the other hand, we propose the use of a thermoplastic polymeric acid. This permits molding of the acid and carbonate into a wafer without the use of a further binder material. With the desired solubility it better permits a water solution to wet and to permeate the pores in such a wafer. Then too, most of the gassing reaction occurs with the wafer. This largely avoids contamination of the solution with cations that must then be removed by ion exchange and enables better control of the bubble size and gas generation rate. Moreover, essentially all of the polymeric acid enters into the reaction, thereby providing more $CO_2$ per unit of material than the ion exchange resins, since the latter react only at the particle surfaces.

When a porous wafer containing the water soluble polymeric acid and slightly soluble carbonate is placed in water, rapid gas evolution occurs. The metal ions combine with the polymeric acid and render it insoluble without releasing any disagreeable salt flavors.

An alternative procedure is to react the soluble polymer with a soluble carbonate or bicarbonate. The characteristics of such a system, however, are less desirable. When a wafer containing both water soluble polymer acids and soluble carbonates or bicarbonates is submerged in water, carbon dioxide bubbles are released, but the salt of the polymer acid swells into a gelatinous mass. This may impart some salty flavor to the solution if made into a beverage that is not consumed for a long period, since the polymer salt in this case appears to be slightly soluble. Nevertheless, this alternative does represent an improvement over prior systems in that the slightly soluble polymer salt does remain bound into a single mass rather than disintegrating into particles or going completely into solution.

A third combination within the scope of our invention is to react a slightly soluble polymeric acid and a slightly soluble carbonate. As in the first case above, the result will be an insoluble product.

Gas evolution may be further accelerated by the addition of dry acid powders, such as citric or tartaric acid, to the surface of the wafer. The dry acid powder may be also mixed in substantial amounts throughout the polymer acid and carbonate. Ratios by weight of tartaric acid to polymer acid as high as 3:1 have been tried without adding any disagreeable flavor to the water solution. A high ratio is generally to be preferred because of low cost of citric and tartaric acids relative to that of polymeric acids.

In a system that involves a multivalent carbonate, the reaction product with the citric or tartaric acid is usually insolube. The insoluble salt of citric or tartaric acid is held in place by the binding action of the polymer acid salt. This binding action may be both chemical and physical when the metal ions have a valence greater than one. It is to be particularly noted, however, that the addition of such acids to the wafer, especially on the surface thereof, not only accelerates gas generation, but promotes more uniform bubbling from all surfaces of the wafer. While the reason for this is not fully known, it is thought that perhaps the pores in the wafer become clogged by the formation of insoluble reaction products and the accelerated gassing purges these pores. This purging, however, does not appear to discharge such products from the wafer into the beverage. Another possible explanation is that some ionization of the citric or tartaric acid occurs at the surfaces of the tablet during molding at elevated temperatures. Such ionization may then result in limited carbon dioxide generation during the molding operation which could cause the molded body to be more porous.

As pointed out above, a convenient form in which to utilize the material of the present invention is in the form of a tablet or wafer. The use of such a tablet or wafer is illustrated in FIG. 1. A container 10 is filled with a beverage 11. A wafer 12, made in accordance with our invention, is shown submerged in and carbonating the beverage 11. In FIG. 2 a container 13 is filled with a beverage 14 that is being carbonated by the material of our invention 15, which is formed as a coating on the bottom of the container 13.

Figure 3:
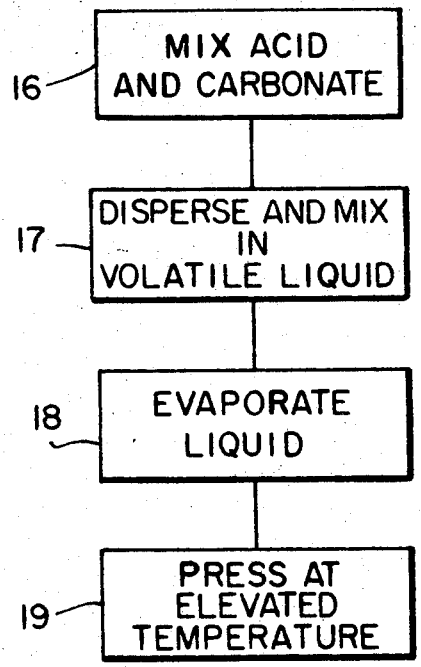
FIG. 3 is a flow chart illustrating the process for making an adherent porous body in accordance with the present invention.

The preferred method of making such a tablet or wafer is illustrated generally in FIG. 3. The acid and carbonate are mixed dry as shown at 16. The dry mixture is then dispersed in a non-dissolving volatile liquid to aid in uniform dispersion of the materials as pointed out at 17. Following this, the volatile liquid is then evaporated to leave a slightly adherent porous mass or residue shown at 18. The residue is then pressed at a temperature, pressure and for a time sufficient to produce a firmly adherent mass permeable to water and water solutions as illustrated at 19. In selecting a suitable pressure it is important to recognize that if the pressure is insufficient, the pores in the wafer will be too large and the gas bubbles formed will be undesirably large. At the other extreme, if the pressure is too high, the wafer may not be sufficiently porous to be fully permeable to water. While the above method is preferred, the dry powder may be mixed and pressed without going through the step of dispersing it in a volatile liquid. Handling, however, becomes more difficult.

EXAMPLE I

One desirable way to prepare the wafer form of the present invention is as follows:

(1) Mix 16 grams of Carbopol 940 (trademark of the B. F. Goodrich Company for one form of their carboxy vinyl polymer (polyacrylic) acids of extremely high molecular weight with a specific gravity of 1.41, 1% water solutions of which has a pH value of 3), 64 grams of precipitated calcium carbonate, and disperse thoroughly in 200 ml. of toluene.

(2) Fill 16⅛" deep by 2" diamter containers with the above dispersion and evaporate the toluene at 110° C.

(3) Remove each wafer and press it between Teflon films at 325° F. for one minute at 150 pounds per square inch.

EXAMPLE II

Form the wafers identical to Example I and adhere the pressed wafers to the bottoms of paper cups with a hot melt adhesive such as Piccovar L–30 (trademark of the Pennsylvania Industrial Chemical Corporation for its low molecular weight alkyl-aromatic polymer), or ethylene-vinyl acetate copolymer adhesive. Thermosetting adhesives such as epoxys or polyesters are also satisfactory.

EXAMPLE III

Prepare the wafer as indicated in Example I with the additional step of sprinkling 0.15 gram of citric acid powder on the surface of the wafer before pressing.

EXAMPLE IV

Prepare in accordance with Example I but add four grams of citric acid powder to the initial mix.

EXAMPLE V

Repeat the process of Example IV with the addition of a digestive juice buffering compound and/or a headache remedy such as aspirin or acetanilide.

Numerous variations of the above examples may be accomplished by substituting equivalent materials for those recited above. For instance one might use the polyacrylic acid marketed by B. F. Goodrich under the designation "Good-Rite WS–801." This is in the form of a white powder, the preferable form of the acid. It has a molecular weight of around 250,000, a pH of 2.1 in a 5 percent aqueous solution, and a viscosity of 10 centipoises in a 2 percent aqueous solution (Brookfield, 20 r.p.m.). Other suitable polymeric acids include heteropolymers of methyl vinyl ether and maleic anhydride as well as copolymers of ethylene and maleic anhydride. Suitable carbonates in addition to calcium carbonate are, for example, magnesium carbonate, aluminum carbonate, and others which are capable of the exchange reaction with the polymeric acid to produce carbon dioxide and an insoluble salt.

EXAMPLE VI (1) Dry mix 8.5 grams sodium bicarbonate and 9 grams of EMA91 (trademark of Monsanto Company for its copolymers of ethylene with maleic anhydride).

(2) Press between Teflon release films at 300° F. to produce porous wafer.

For acid flavoring, tartaric, ascorbic, and fumaric acids can be substituted for citric acid.

Any number of non-dissolving volatile fluids, both aromatic and aliphatic may be used instead of toluene as, for example, heptane.

Still further variations in the process of the present invention may include such things as surface texturing or roughening of the wafer and reinforcement of the wafer with fibers such as cellulose.

The ratio of carbonate to acid may vary from stoichiometric proportion to a substantial excess of the carbonate. Preferably there is carbonate excess to ensure substantially complete depletion of the acid. This prevents contamination of the beverage by unreacted acid in the case where a soluble acid is used. Also, the acid is generally more expensive than the carbonate and utilization of all the acid is therefore to be desired on the basis of cost. With an insoluble carbonate such as calcium carbonate, there is little or no contamination by unused carbonate, since the latter is physically retained in the matrix comprising the insoluble reaction product.

This does impose an upper limit in the amount of carbonate. If there is too much, the matrix will not effectively retain the unreacted portion. For example, assuming a polymeric acid, such as polyacrylic acid, which may have an acid group for each monomer unt and about the same molecular weight, the ratio of carbonate groups to acid groups may vary from about 1:2 to 20:1 and is preferably in the range of 2:1 to 10:1; an excellent ratio is 4:1.

Molding can satisfactorily be accomplished within the range from 0 to 500 pounds per square inch and from room temperature to 375° F. while providing a wafer of satisfactory porosity to be fully permeable to water and water solutions.

While the invention has been described in connection with the use of a polymeric acid, it is to be understood that either the acid or the carbonate or both may be in polymeric form. An important aspect of the invention is that the reaction product be a substantially insoluble, adherent mass.

Although the principal interest in the dry carbon dioxide-generating material described above undoubtedly is in the preparation of a drink for immediate consumption, another mode of use is to add plain or flavored water to the composition in a closed container so that the water becomes supersaturated with carbon dioxide. Depending upon the stoichiometric quantities of reactants used, a thoroughly sufficient volume of carbon dioxide can be generated. For example, for every gram of polyacrylic acid mixed with an excess of carbonate, 150 cc. of $CO_2$ (atmospheric pressure) is produced. In other words, one gram of polyacrylic acid will produce about ½ volume of $CO_2$ in an 8 oz. container. It is well known that cola beverages are bottled with about 3.7 volumes of gas and orange with about 1.2 volumes. To make such a beverage with the material of this invention, the required amount of constituents may be easily calculated, mixed in a container and sealed up while the reaction is in progress. Thus the material of this invention may be used to make a sealed or bottled beverage at home or elsewhere.

Yet another mode of use involves molding the material of this invention into slugs or pellets to generate gas for propulsion of water toys or as a gas source for inflatable toys.

From the above description it is clear that the present invention differs materially from existing products. First, it does not require keeping carbon dioxide under pressure in a sealed container. Secondly, it has the advantages of the present dry "fizz" systems without any disagreeable salt flavor. Additionally, it provides a carbonated beverage at lower cost than commercially bottled beverages by eliminating the bottling cost and much of the distribution cost.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of langauge, might be said to fall therebetween.

Having described our invention, what we claim as new and desire to secure by Letters Patent is:

1. The method of making a carbonated water based composition comprising the steps of combining, in a container, water and a carbon dioxide-evolving solid material consisting essentially of an at least slightly water soluble polymeric acid and a carbonate, said acid and carbonate being such that the salt produced by their reaction in said water is substantially water insoluble and the physical integrity of the solid material is maintained.

2. The method of claim 1 wherein the polymeric acid is selected from the group consisting of polyacrylic and its copolymers.

3. The method of claim 1 wherein the carbonate is calcium carbonate.

4. The method of claim 2 wherein the carbonate is calicum carbonate.

References Cited

UNITED STATES PATENTS

| 1,336,720 | 4/1920 | Baulig | 99—79X |
| 2,851,360 | 9/1958 | Diller | 99—78 |
| 2,909,462 | 10/1959 | Warfield et al. | 424—81 |

OTHER REFERENCES

B. F. Goodrich Chem. Co., Service Bulletin GC-20, March 1954, Carbopol 934, pp. 2, 4, and 11.

ALVIN E. TANENHOLTZ, Primary Examiner

S. B. DAVIS, Assistant Examiner

U.S. Cl. X.R.

99—78; 252—188.3; 424—44, 81